(12) United States Patent
Yan

(10) Patent No.: US 11,693,484 B2
(45) Date of Patent: Jul. 4, 2023

(54) DEVICE CONTROL METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventor: Fenggui Yan, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/555,039

(22) Filed: Dec. 17, 2021

(65) Prior Publication Data
US 2022/0107689 A1 Apr. 7, 2022

Related U.S. Application Data

(63) Continuation of application No. PCT/CN2020/103088, filed on Jul. 20, 2020.

(30) Foreign Application Priority Data

Jul. 31, 2019 (CN) .......................... 201910701490.0

(51) Int. Cl.
*G06F 3/01* (2006.01)
*G06F 3/0346* (2013.01)

(52) U.S. Cl.
CPC ............ *G06F 3/017* (2013.01); *G06F 3/0346* (2013.01)

(58) Field of Classification Search
CPC ........ G06F 3/017; G06F 3/0346; G06F 3/041; G06F 3/0488; G06F 3/04883; G06F 2203/04108; G06F 3/0416
See application file for complete search history.

(56) References Cited

U.S. PATENT DOCUMENTS

| | | | |
|---|---|---|---|
| 9,354,709 | B1 | 5/2016 | Heller et al. |
| 2014/0282272 | A1* | 9/2014 | Kies ........................ G06F 3/017 715/863 |
| 2014/0282280 | A1 | 9/2014 | Pack et al. |

(Continued)

FOREIGN PATENT DOCUMENTS

| | | | |
|---|---|---|---|
| CN | 104267819 | * | 1/2015 |
| CN | 104463119 | | 3/2015 |

(Continued)

OTHER PUBLICATIONS

CNIPA, First Office Action for CN Application No. 201910701490.0, dated Jan. 28, 2021.

(Continued)

*Primary Examiner* — Grant Sitta
(74) *Attorney, Agent, or Firm* — Hodgson Russ LLP

(57) ABSTRACT

A device control method, a device control apparatus, an electronic device, and a storage medium are provided. The electronic device includes an ultrasonic emitter and an ultrasonic receiver. The method includes that operating gesture recognition is performed by the electronic device through ultrasonic waves, a recognition result is generated, a motion parameter of the electronic device is obtained, the recognition result is verified based on the motion parameter, and the electronic device is controlled based on a verification result.

16 Claims, 11 Drawing Sheets

(56) References Cited

U.S. PATENT DOCUMENTS

2015/0261495 A1* 9/2015 Smus .................. G06F 3/167
                                                                          345/156
2016/0378270 A1 12/2016 Lee et al.

FOREIGN PATENT DOCUMENTS

| CN | 104978014 | 10/2015 |
| CN | 105242861 | 1/2016 |
| CN | 105278667 | 1/2016 |
| CN | 105391854 | 3/2016 |
| CN | 109344586 | 2/2019 |
| WO | 2017034748 | 3/2017 |

OTHER PUBLICATIONS

WIPO, International Search Report for PCT/CN2020/103088, dated Oct. 21, 2020.
EPO, Extended European Search Report for EP Application No. 20845961.0, dated Jul. 25, 2022.

\* cited by examiner

DEVICE CONTROL METHOD, ELECTRONIC DEVICE, AND STORAGE MEDIUM

CROSS-REFERENCE OF RELATED APPLICATIONS

This application is a continuation of International Application No. PCT/CN2020/103088, filed on Jul. 20, 2020, which claims priority to Chinese Patent Application No. 201910701490.0, filed on Jul. 31, 2019, the entire disclosures of which are incorporated herein by reference.

TECHNICAL FIELD

This disclosure relates to the technical field of terminals, and in particular to a device control method, a device control apparatus, an electronic device, and a storage medium.

BACKGROUND

With development of terminal technology, more electronic devices are equipped with ultrasonic devices and are controlled based on the ultrasonic devices. However, in related ways of controlling devices based on ultrasonic waves, control accuracy still needs to be improved.

SUMMARY

In a first aspect, a device control method is provided in the present disclosure. The method is applicable to an electronic device which includes an ultrasonic emitter and an ultrasonic receiver, and the method includes the following. Operating gesture recognition is performed by the electronic device through ultrasonic waves, and a recognition result is generated. A motion parameter of the electronic device is obtained. The recognition result is verified based on the motion parameter, and the electronic device is controlled based on a verification result.

In a second aspect, an electronic device is provided in the present disclosure. The electronic device includes an ultrasonic emitter, an ultrasonic receiver, a processor, and a memory. One or more programs are stored in the memory and are configured to be executed by the processor to realize the method in the first aspect.

In a third aspect, a non-transitory computer-readable storage medium is provided in the present disclosure. The non-transitory computer-readable storage medium is configured to store program codes which, when operated by a processor, are operable with a computer to perform the method in the first aspect.

BRIEF DESCRIPTION OF THE DRAWINGS

In order to describe technical solutions of implementations more clearly, the following will give a brief introduction to the accompanying drawings used for describing the implementations. Apparently, the accompanying drawings hereinafter described are some implementations of the disclosure. Based on these drawings, those of ordinary skill in the art can also obtain other drawings without creative effort.

DETAILED DESCRIPTION

In order for those skilled in the art to better understand technical solutions of implementations, the technical solutions of implementations will be described clearly and completely with reference to accompanying drawings in the implementations. Apparently, implementations hereinafter described are merely some implementations, rather than all implementations, of present disclosure. All other implementations obtained by those of ordinary skill in the art based on the implementations herein without creative efforts shall fall within the protection scope of the present disclosure.

Figure 1:
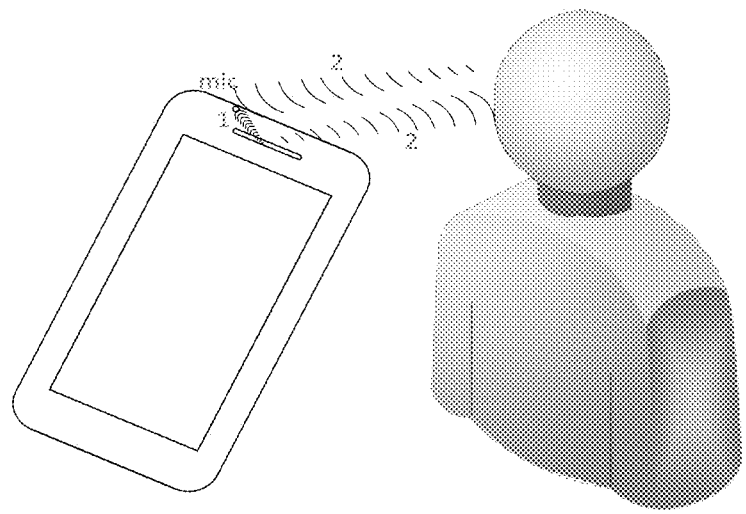
FIG. 1 is a schematic view illustrating a propagation path of ultrasonic waves provided in implementations of the present disclosure.

With popularity of a full-screen design for electronic devices, more manufacturers have been using an ultrasonic proximity detecting solution to replace a traditional infrared proximity detecting solution on an electronic device, in order to save space on the top of the electronic device. The electronic device emits ultrasonic waves through an ultrasonic emitter (such as an earpiece, a speaker, a special ultrasonic emitter, etc.). A part of the ultrasonic waves directly reach an ultrasonic receiver (a pick-up) through air (such as path 1 in FIG. 1), and the other part of the ultrasonic waves are reflected by an object to reach the ultrasonic receiver through air (such as path 2 in FIG. 1). The ultrasonic receiver picks up superimposed signals of direct and reflected ultrasonic waves, and the superimposed signals are converted into audio signals by an analog to digital (A/D) converter. Audio data are processed through an algorithm to obtain a motion state of the object relative to the electronic device, so as to instruct a display screen of the electronic device to be in a screen-on state or a screen-off state.

Figure 2:
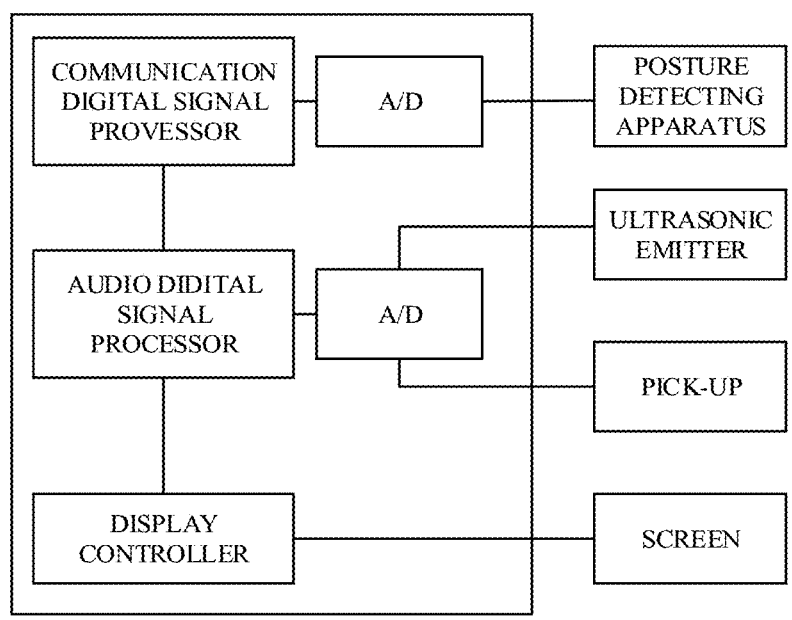
FIG. 2 is a schematic view illustrating emission and reception of ultrasonic waves and transmission of sensing data.

Specifically, when the electronic device is monitored to be in a call state, an ultrasonic signal with a fixed frequency can be emitted through a built-in ultrasonic emitter of the electronic device. It can be understood that, a part of the ultrasonic waves emitted by the ultrasonic device directly reach the ultrasonic receiver through the air, and the other part of the ultrasonic waves are reflected by the object to reach the ultrasonic receiver through the air. The ultrasonic receiver picks up the superimposed signals of direct and reflected ultrasonic waves, and the superimposed signals are converted into the audio signals by the A/D converter. The object may include a human face, a human body, etc. For example, as illustrated in FIG. 2, the ultrasonic signal with the fixed frequency is emitted through a built-in earpiece, speaker or special ultrasonic emitter of the electronic device. The part of the ultrasonic waves directly reach the pick-up through the air, and the other part of the ultrasonic waves are reflected by the object to reach the pick-up through the air. The pick-up picks up the superimposed signals of direct and reflected ultrasonic waves, and the superimposed signals are converted into the audio signals by the A/D converter.

In addition, after obtaining the ultrasonic waves, the electronic device can convert the obtained ultrasonic waves into the audio data through the A/D converter, transmit the audio data to an audio digital signal processor (ADSP), and process the audio data through the ADSP. At the same time, after a sensor obtains sensing data, the sensing data can be transmitted to a communication digital signal processor (CDSP) and be processed by the CDSP, so as to obtain posture information of the electronic device. Then the CDSP can transmit the posture information of the electronic device to the ADSP at a fixed period. The ADSP can process obtained audio data to obtain a motion state of the object relative to the electronic device. At the same time, the ADSP can process the posture information of the electronic device transmitted from the CDSP, in other words, the ADSP can control display contents on a screen of the electronic device according to the obtained motion state and obtained the posture information of the electronic device. For example, while the electronic device is displaying a short video, the ADSP can control the short video to switch. While the electronic device is displaying a text content, the ADSP can control the screen to turn a page and other operations.

However, after research, inventors find that misrecognition occurs during operating gesture recognition through ultrasonic waves.

It should be noted that, in this implementation, the electronic device includes the ultrasonic emitter and the ultrasonic receiver. The ultrasonic emitter moves relative to an obstacle, in other words, the electronic device moves relative to the obstacle, such that the ultrasonic receiver also moves relative to the obstacle. According to Doppler effect, wavelength of a wave radiated by the object changes due to relative motion of a wave source (the electronic device) and an observer (the obstacle), and Doppler effect formula is $$f' = \left(\frac{v \pm v_0}{v \pm v_s}\right) f,$$

where f' is an observed frequency, f is an original emitted frequency of an emission source in a medium, v is a propagation velocity of a wave in the medium, $v_0$ is a moving velocity of the observer, and $v_s$ is a moving velocity of the emission source. If the observer is moving toward the emission source, an arithmetic sign in front of $v_0$ is positive, otherwise, the arithmetic sign in front of $v_0$ is negative. If the obstacle is moving toward the observer, an arithmetic sign in front of $v_s$ is negative, otherwise, the arithmetic sign in front of $v_s$ is positive. According to the Doppler effect formula, when the emission source is relatively moving toward the observer, frequencies of signals received by the observer will increase; when the emission source is relatively moving away from the observer, the frequencies of the signals received by the observer will decrease; when the emission source is relatively stationary to the observer, the frequencies of the signals received by the observer is the same as frequencies of signals emitted by the emission source. An operating gesture matched with received signals can be obtained by conducting a series of processing on the received signals.

It can be understood that, in the process of ultrasonic control based on the operating gesture, a user's hand (or other hand-held objects) usually moves from an end of the electronic device with the ultrasonic emitter to the other end of the electronic device with the ultrasonic emitter. During this process, the electronic device itself will not move or only shake slightly. As an implementation, if the user holds the electronic device to move the electronic device toward the object and then move the electronic device away from the object, the electronic device will still recognize changes of ultrasonic frequencies based on ultrasonic signals received by the ultrasonic receiver, such that the electronic device will misrecognize that the user is controlling electronic device.

Therefore, a device control method, a device control apparatus, an electronic device, and a storage medium are provided in the present disclosure to improve the above problems. The method provided in implementations of the present disclosure can use a motion parameter of the electronic device, to verify a result of operating gesture recognition obtained by ultrasonic waves, such that accuracy of the gesture recognition through ultrasonic waves can be further improved.

The following will describe specifically the implementations of the present disclosure, with reference to the accompanying drawings.

Figure 3:
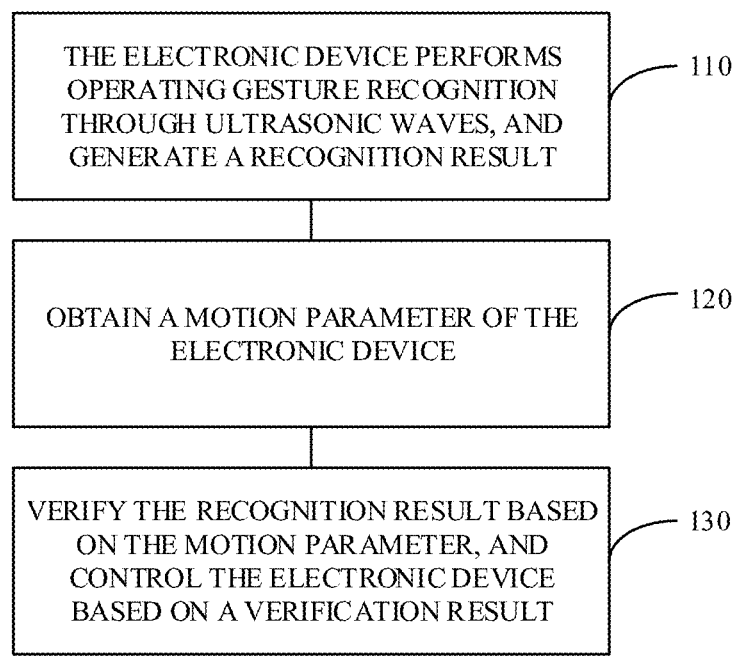
FIG. 3 is a schematic flowchart illustrating a device control method provided in implementations of the present disclosure.

As illustrated in FIG. 3, a device control method is provided in implementations of the present disclosure. The method is applicable to an electronic device which includes an ultrasonic emitter and an ultrasonic receiver, and the method begins at block 101.

At block 110: operating gesture recognition is performed by the electronic device through ultrasonic waves, and a recognition result is generated.

It should be noted that, the electronic device provided in the implementations of the present disclosure can have multiple ultrasonic emission ways. As an implementation, the electronic device can keep periodical ultrasonic signal emission after the electronic device is powered on. As an implementation, the electronic device can emit ultrasonic signals after entering a certain target scenario.

It can be understood that, after the electronic device is powered on, some routine operations may be conducted on the electronic device. For example, several common applications are launched, or the electronic device is triggered into some operating modes, for example, a meeting mode or an outdoor mode, etc. When the electronic device is provided with a function of the operating gesture recognition based on the ultrasonic waves, the user can control the electronic device which is powered on through a non-touch operating gesture.

In addition, when the electronic device is running a novel reading application or playing a video, display of the electronic device may be controlled. For example, the electronic device is controlled to turn a page to display a novel or a short video of a next page. On condition that the electronic device is provided with the function of the operating gesture recognition based on the ultrasonic waves, the novel and the short video displayed on the electronic device can be switched through the non-touch operating gesture. In this case, when the electronic device detects that specific applications start to run, the electronic device can determine that the specific applications have entered a specific scene, and then the ultrasonic signals are triggered to be emitted.

It can be understood that, the operating gesture recognition based on the ultrasonic waves may increase a certain amount of power consumption, therefore, the user can configure some applications with a function of ultrasonic recognition operating gesture when some applications are running. As an implementation, the aforementioned specific applications (i.e., applications which are allowed to enable the operating gesture recognition based on the ultrasonic waves) can be recognized through a list.

In the implementation that the aforementioned specific applications can be recognized through the list, the electronic device can be provided with a storage region for storing a list-based configuration file in a storage space corresponding to a system program. Package names of the specific applications which are allowed to enable the operating gesture recognition based on the ultrasonic waves or other contents for application identification are stored in the list-based configuration file. When the electronic device launches an application, the list-based configuration file is searched for a currently launched or foreground running application. If the currently launched or foreground running application is in the list-based configuration file, the ultrasonic signals can be emitted by the ultrasonic emitter. As an implementation, if the electronic device uses an Android operating system, a name of a currently foreground running application can be obtained by executing a getRunningTasks method of an ActivityManager. In addition, the electronic device can also obtain a list of applications used by the user through a UsageStatsManager, and recognize a recently used application recorded in the list as the currently foreground running application. Furthermore, the electronic device can also monitor a change of a window focus through an Android's own accessibility function, and take a package name corresponding to a focus window as the currently foreground running application.

Optionally, applications in the configuration file can be controlled by the user. Correspondingly, the electronic device can set a configuration interface, such that the user can control which applications are allowed to enable the operating gesture recognition based on the ultrasonic waves.

Figure 4:
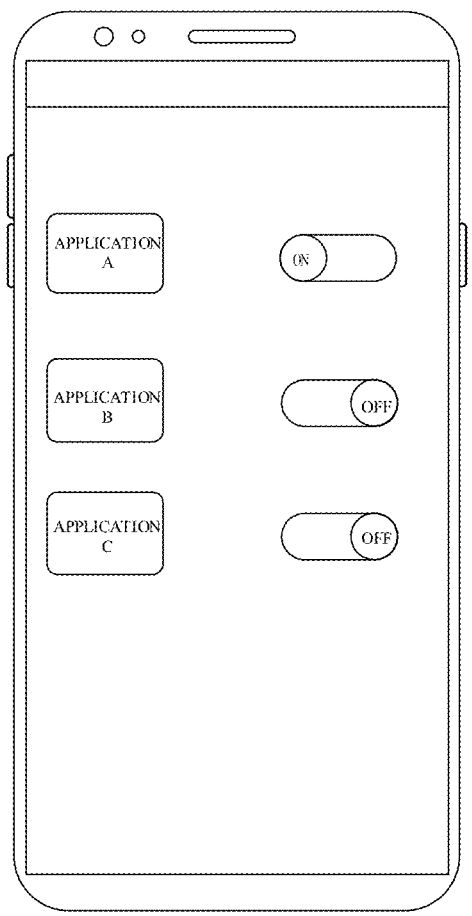
FIG. 4 is a schematic view illustrating controls in a device control method provided in implementations of the present disclosure.

For example, as illustrated in FIG. 4, multiple applications and a state of a controlling control corresponding to each of the multiple applications are displayed in an interface. It can be understood that, if a state of a controlling control corresponding to an application is "off" as illustrated in FIG. 4, it indicates that the application is removed form or not added to the above list, in other words, the application will not be recorded in the aforementioned configuration file. If the state of the controlling control corresponding to the application is "on" as illustrated in FIG. 4, it indicates that the application is added to the above list. For example, the state of the controlling control corresponding to an application named "application A" is "on", which indicates that "application A" will exist in the aforementioned list. The state of the controlling control corresponding to an application named "application B" is "off", which indicates that "application B" does not exist in the aforementioned list. It can be understood that, an application in the list allows to enable the operating gesture recognition based on the ultrasonic waves.

It can be understood that, the electronic device can set a variable, and mark the state of the controlling control through the value of the variable. For example, if the variable value is 0, it indicates that the controlling control is in a state which represents an application is not allowed to enable the operating gesture recognition based on the ultrasonic waves, and if the variable value is 1, it indicates that the controlling control is in a state which represents an application allows to enable the operating gesture recognition based on the ultrasonic waves.

Furthermore, the operating gesture recognition can be performed through various methods of ultrasonic waves in implementations of the present disclosure.

As an implementation, a time difference method can be used.

As an implementation, the electronic device emits scanning signals in an ultrasonic frequency band at intervals through the ultrasonic receiver, and receives reflected and direct (i.e., non-stop) ultrasonic signals through the ultrasonic receiver. A relative distance between the obstacle and the electronic device is determined by comparing a time difference between different received ultrasonic signals through an algorithm, and a relative velocity is also calculated according to the relative distance. A relative motion state between the electronic device and the obstacle can be further determined according to the relative distance and the relative velocity, such that a corresponding gesture can be recognized according to the relative motion state.

As an implementation, a phase difference method can be used.

As an implementation, the electronic device emits ultrasonic signals continuously through the ultrasonic emitter. By calculating a correlation index between an emitted signal and a receiver signal, a receiving end determines a phase difference when reflected ultrasonic waves reach the ultrasonic receiver. The relative distance between the obstacle and the electronic device is determined according to the phase difference, the relative velocity can also be calculated by the relative distance, and the relative motion state between the electronic device and the obstacle can be further determined according to the relative distance and the relative velocity, such that the corresponding gesture can be recognized according to the relative motion state.

As an implementation, a method that a difference of the Doppler effect areas is an audio feature can be used.

In this implementation, the difference of the Doppler effect areas is obtained by subtracting a spectral intensity within a frequency range and less than an ultrasonic emitting frequency from a spectral intensity within the frequency range and greater than the ultrasonic emitting frequency: doppler_dif=sum_up−sum_low.

Different motion states of the obstacle relative to the electronic device can cause regular changes of doppler_dif. When the obstacle is approaching the electronic device at a certain velocity, doppler_dif is a greater positive value. When the obstacle is moving away from the electronic device at a certain speed, doppler_dif is a smaller negative value. When the obstacle and the electronic device are relatively stationary, doppler_dif is a value close to 0. Furthermore, the motion state of the obstacle relative to the electronic device can be determined by setting a positive threshold and a negative threshold. When doppler_dif is greater than threshold1, the motion state of the obstacle relative to the electronic device is determined as a "close" state. When doppler_dif is less than threshold2, the motion state of the obstacle relative to the electronic device is determined as an "away" state. When doppler_dif is between threshold1 and threshold2, the motion state of the obstacle relative to the electronic device is determined as a "normal" state. As such, the operating gesture is determined according to the "close" state and the "normal" state.

At block 120: a motion parameter of the electronic device is obtained.

The motion parameter of the electronic device includes at least one of: a motion direction, an acceleration, and a motion distance.

At block 130: the recognition result is verified based on the motion parameter, and the electronic device is controlled based on a verification result.

Referring to the foregoing, as an implementation, in the process of ultrasonic control based on the operating gesture, a user's hand (or other hand-held objects) usually moves from an end of the electronic device with the ultrasonic emitter to the other end of the electronic device with the ultrasonic emitter. During this process, the electronic device itself will not move or only shake slightly. As an implementation, if the user holds the electronic device to move the electronic device toward the object and then move the electronic device away from the object, the electronic device will still recognize changes of ultrasonic frequencies based on ultrasonic signals received by the ultrasonic receiver, such that the electronic device will misrecognize that the user is controlling electronic device.

Therefore, on condition that the electronic device has obtained the recognition result of an operating gesture based on the ultrasonic waves, combined with the motion parameters of the electronic device itself, the electronic device can obtain whether or how the electronic device itself moves when the electronic device recognizes the operating gesture, so as to determine whether a recognized operating gesture is accurate.

A device control method is provided in the present disclosure. In the method, the operating gesture recognition can be performed through ultrasonic waves and based on the ultrasonic emitter and the ultrasonic receiver, the recognition result can be generated, and the motion parameter of the electronic device can also be obtained. Then the recognition result is verified based on the motion parameter, and the electronic device is controlled based on the recognition result. According to the method, the motion parameter of the electronic device can be used to verify the recognition result of operating gesture obtained by the ultrasonic waves, such that the accuracy of the gesture recognition through ultrasonic waves can be further improved.

Figure 5:
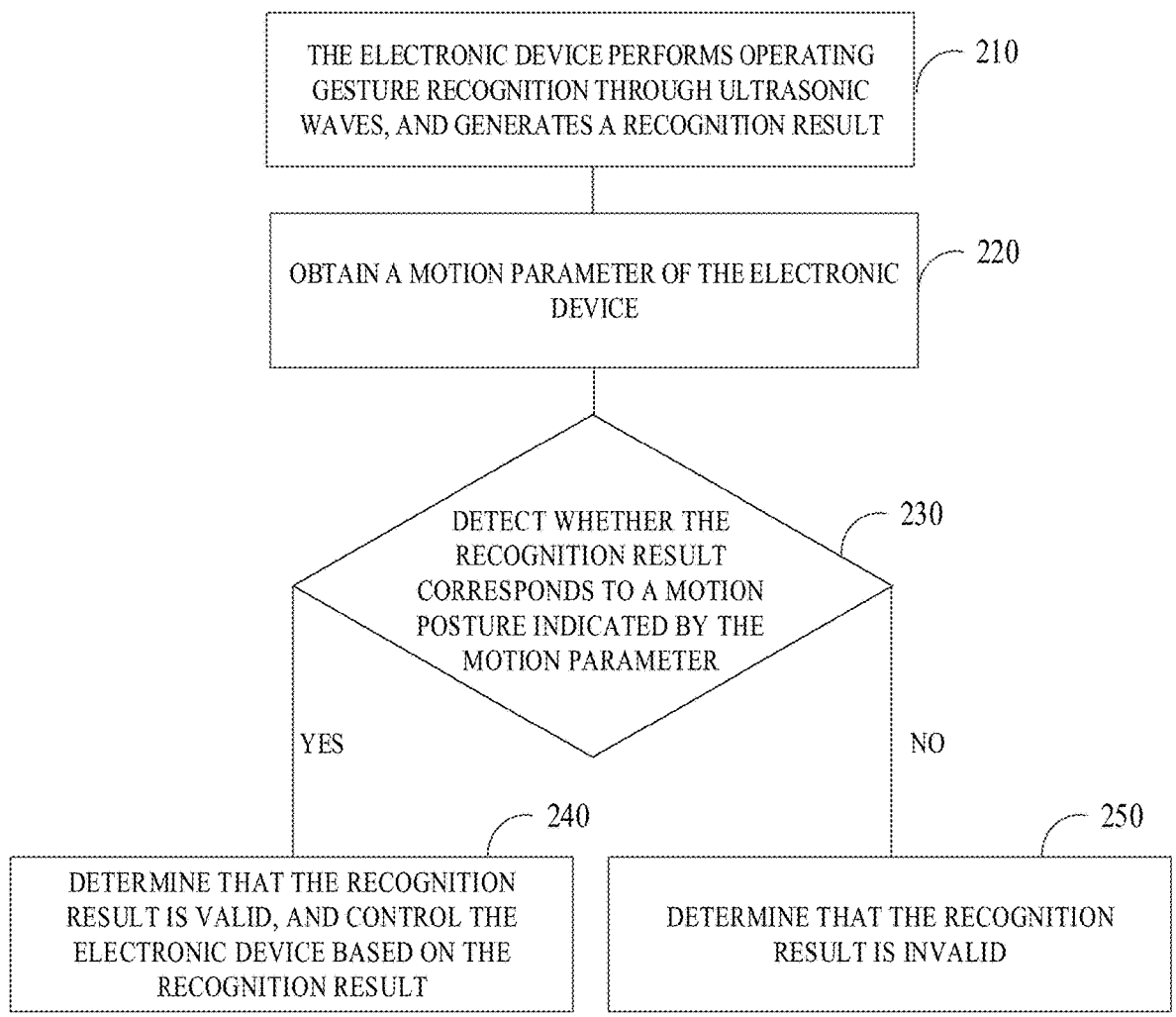
FIG. 5 is a schematic flowchart illustrating a device control method provided in other implementations of the present disclosure.

As illustrated in FIG. 5, a device control method is provided in implementations of the present disclosure. The method is applicable to an electronic device which includes an ultrasonic emitter and an ultrasonic receiver. The method begins at block 201.

At block 210: the operating gesture recognition is performed by the electronic device through ultrasonic waves, and a recognition result is generated.

At block 220: the motion parameter of the electronic device is obtained.

As an implementation, the electronic device can collect the motion parameter by a gyroscope.

At block 230: whether the recognition result corresponds to a motion posture indicated by the motion parameter is detected.

Figure 6:
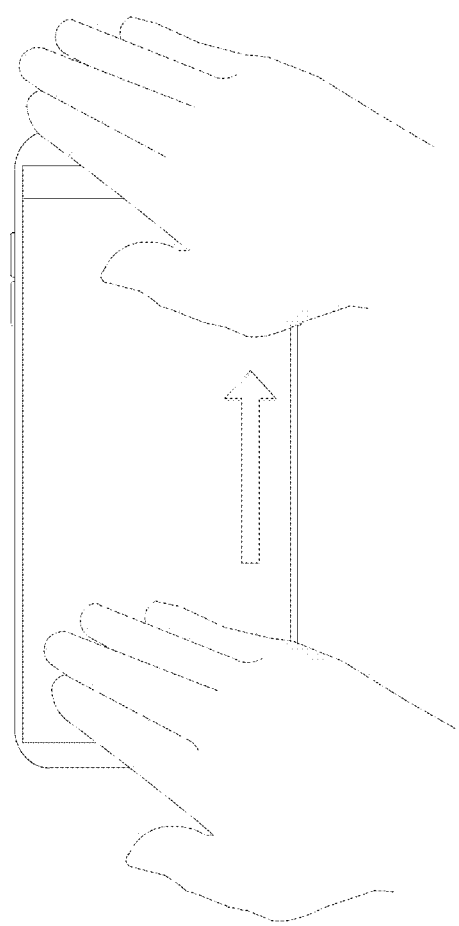
FIG. 6 is a schematic view illustrating an operating gesture in a device control method provided in other implementations of the present disclosure.
Figure 7:
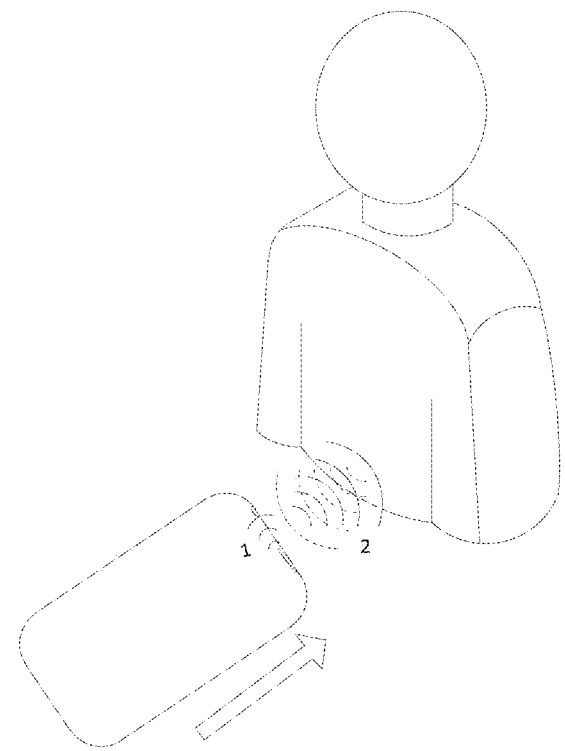
FIG. 7 is schematic view illustrating an electronic device moving close to a user provided in other implementations of the present disclosure.
Figure 8:
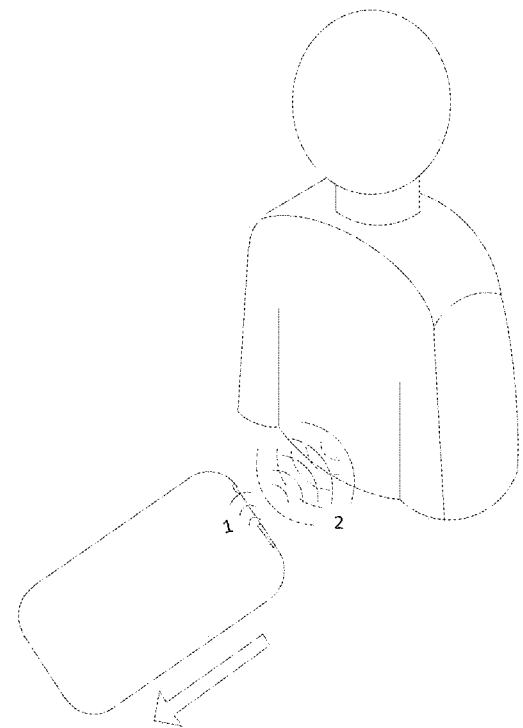
FIG. 8 is schematic view illustrating an electronic device moving away from a user provided in other implementations of the present disclosure.

It can be understood that, when the user performs a non-touch operation by a hand according to a specified rule, the electronic device itself will not move or only shake slightly. For example, as illustrated in FIG. 6, when the user performs a non-touch sliding operation by a hand in an arrow direction, the electronic device will recognize an operating gesture through ultrasonic signals emitted by the ultrasonic emitter and ultrasonic signals reflected by the user's hand. During this process, the electronic device itself will not move. As illustrated in FIG. 7 and FIG. 8, the electronic device itself will emit the ultrasonic signals, and the electronic device will move toward the user and then move away from the user, such that the electronic device will also recognize an operating gesture during this process. However, the user does not perform gesture operations during this process. In addition, during this process illustrated in FIG. 7 and FIG. 8, the electronic device itself is in the motion state.

As an implementation, by establishing a corresponding relationship between the operating gesture recognized by the electronic device through ultrasonic waves and the motion parameter of the electronic device, the electronic device can recognize whether the user is controlling the electronic device through a gesture currently As an implementation, whether the recognition result corresponds to the motion posture indicted by the motion parameter is detected as follows.

The recognition result is determined to correspond to the motion posture, in response to detecting that the recognized operating gesture indicated by the recognition result is a target gesture, and the motion parameter indicates that the electronic device is stationary. The recognition result is determined to not correspond to the motion posture, in response to detecting that the recognized operating gesture indicated by the recognition result is the target gesture, and the motion parameter indicates that the electronic device is moving in a specified direction. A moving direction of the target gesture corresponds to the specified direction.

It can be understood that, when the user actually wants to control the electronic device through the gesture, the electronic device is usually stationary. If the electronic device recognizes that the operating gesture through ultrasonic waves, and determines that a current motion parameter of the electronic device indicates that the electronic device is stationary, the electronic device can determine that the recognition result corresponds to the motion posture indicated by the motion parameter. On the contrary, if the electronic device recognizes that the operating gesture through ultrasonic waves, and determines that the current motion parameter of the electronic device indicates that the electronic device is moving in the specified direction, the electronic device can determine that the recognition result does not correspond to the motion posture indicated by the motion parameter, such that the electronic device can determine that the current gesture is a misrecognition gesture, and the electronic device will not respond.

It can be understood that, a moving direction here is the same as or opposite to a gesture moving direction recognized by the electronic device. It should be noted that, in general, the gyroscope disposed in the electronic device is a six-axis gyroscope, which can sense positive accelerations in three directions. In this case, the electronic device can configure a direction of a certain axis of the gyroscope to be consistent with an extending direction from an ultrasonic emitter at one end of the electronic device and another ultrasonic emitter at the other end of the electronic device.

Figure 9:
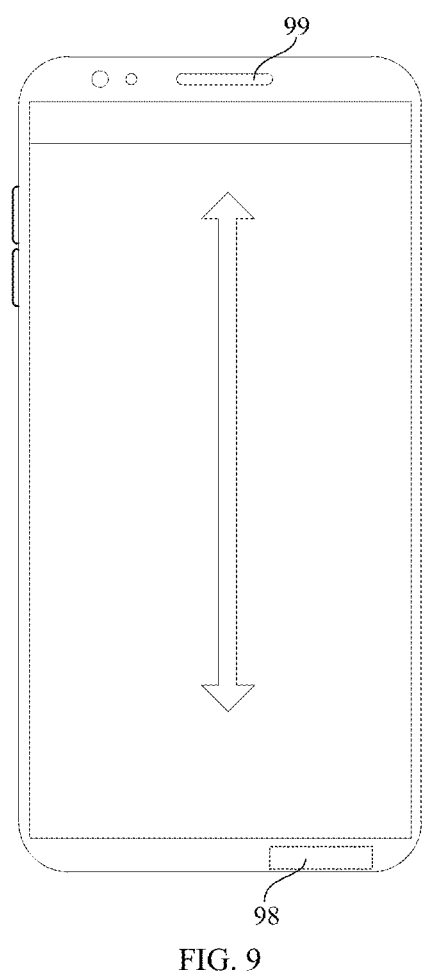
FIG. 9 is schematic view illustrating an extending direction in a device control method provided in other implementations of the present disclosure.

As an implementation, as illustrated in FIG. 9, an earpiece 99 at the top of the electronic device is configured as the ultrasonic emitter, and a speaker 98 at the bottom of the electronic device is also configured as the ultrasonic emitter. In this case, an extending direction from the earpiece 99 to the speaker 98, in other words, a direction indicated by an arrow in FIG. 9, can be configured to coincide with the direction of the certain axis of the gyroscope. For example, if Y axis of the gyroscope is configured to coincide with the direction indicted by the arrow in FIG. 9, the electronic device can collect an acceleration along the Y axis to be the motion parameter of the electronic device, such that whether the electronic device moves along the Y axis can be recognized. It can be understood that, as illustrated in FIG. 9, the aforementioned specified direction is the direction indicated by the arrow in FIG. 9.

As an implementation, recognition results and motion parameters corresponding to the recognition results can be stored in the electronic device through a data table. After a recognition result and a motion parameter are obtained, whether the recognition result corresponds to the motion parameter can be detected by looking up the data table. It can be understood that, in this storing way of the data table, each of corresponding data uniquely identifies a recognition result and a motion parameter, which are same to the recognition result and the motion parameter in the data table, as a recognition result and a motion parameter corresponding to the recognition result.

At block 240: in response to detecting that the recognition result corresponds to the motion posture indicated by the motion parameter, the recognition result is determined to be valid, and the electronic device is controlled based on the recognition result.

On condition that the recognition result is determined to be valid based on the foregoing, the electronic device can be controlled based on the recognized operating gesture. For example, when the electronic device determines that the electronic device is in a scene of short video browsing, the electronic device performs the operating gesture recognition through ultrasonic waves, therefore, on condition that the electronic device recognizes that a control instruction corresponding to the recognized operating gesture is indicative of switching to a next video and the electronic device determines the recognition result to be valid, the electronic device will switch a currently displayed short video to the next video. For another example, when the electronic device determines that the electronic device is in a scene of novel reading, the electronic device performs the operating gesture recognition through ultrasonic waves, therefore, on condition that the electronic device recognizes that a control instruction corresponding to the recognized operating gesture is indicative of switching to a next page and the electronic device determines the recognition result to be valid, the electronic device will switch a currently displayed page to the next page.

At block 250: the recognition result is determined to be invalid in response to detecting that the recognition result does not correspond to the motion posture indicated by the motion parameter.

It can be understood that, if the recognition result is determined to be invalid, the electronic device will not be operated.

The following is an illustration of how the electronic device detects whether the recognition result corresponds to the motion posture indicated by the motion parameter, and how to control the electronic device.

As an implementation, the electronic device can be configured with a separate storage region for storing the recognition result. In this implementation, when the electronic device recognizes the operating gesture, the electronic device can generate the recognition result based on the operating gesture, and then store the recognition result in the storage region. For example, if the electronic device recognizes that the user's gesture is to slide from the bottom of the electronic device to the top of the electronic device, a corresponding recognition result which is to switch to a previous page or a previous video can be generated, and the recognition result can be stored in the storage region. Then, when the motion parameter of the electronic device is obtained, the recognition result stored in the storage region is verified based on the motion parameter. If the recognition result is determined to be valid, the electronic device can be controlled based on the recognition result, and the recognition result stored in the storage region can be deleted. If the recognition result is determined to be invalid, the recognition result can be directly deleted from the storage region.

It should be noted that, in a possible case, the user's hand may shake accidentally back and forth between two ultrasonic emitters of electronic device. For example, if a mosquito flies on the screen of the electronic device, the user may drive the mosquito away, and in the process of driving the mosquito away, the user's hand will shake back and forth on the electronic device. In this case, the electronic device will continuously recognize multiple operating gestures, but the multiple operating gestures are not an operation effect actually wanted by the user.

As an implementation, the electronic device can configure a generation time for each recognition result. When the electronic device detects that the configuration file storing the recognition result is updated, the electronic device can obtain the generation time corresponding to a historically updated recognition result by taking the generation time corresponding to a latest updated recognition result as a starting point, and then obtain the number of recognition results within a specified time period starting from the generation time corresponding to the latest updated recognition result. If the number is greater than 1, it means that the recognition result within the specified time period may be generated by user's misoperation, and the recognition result is determined to be invalid. If the number is 1, the recognition result is taken as a subsequent recognition result to be verified with the motion parameter of the electronic device.

It should be noted that, a no-touch sliding speed of each user from the bottom of electronic device equipped with one ultrasonic emitter to the top of electronic device equipped with the other ultrasonic emitter is different. Therefore, when a process that the user slides from the bottom of electronic device to the top of electronic device is regarded as an operating gesture, a length of time taken by each user to complete the operating gesture may be different. As an implementation, in order to better adapt to a habit of each user's no-touch operating gesture, the length of time taken by each user to complete the operating gesture can be taken as the aforementioned specified time period. Optionally, the length of time taken by the user to complete the operating gesture can be collected periodically, and can also be collected through a configuration interface manually triggered by the user.

A device control method is provided in the present disclosure. In the method, the operating gesture recognition can be performed through ultrasonic waves and based on the ultrasonic emitter and the ultrasonic receiver, the recognition result can be generated, and the motion parameter of the electronic device can be obtained. Then whether the recognition result corresponds to the motion posture indicated by the motion parameter is detected. The recognition result can be determined to be valid in response to detecting that the recognition result corresponds to the motion posture, and the electronic device can be controlled based on the recognition result. According to the method, the motion parameter of the electronic device can be used to verify the recognition result of operating gesture obtained by the ultrasonic waves, such that the accuracy of the gesture recognition through ultrasonic waves can be further improved.

Figure 10:
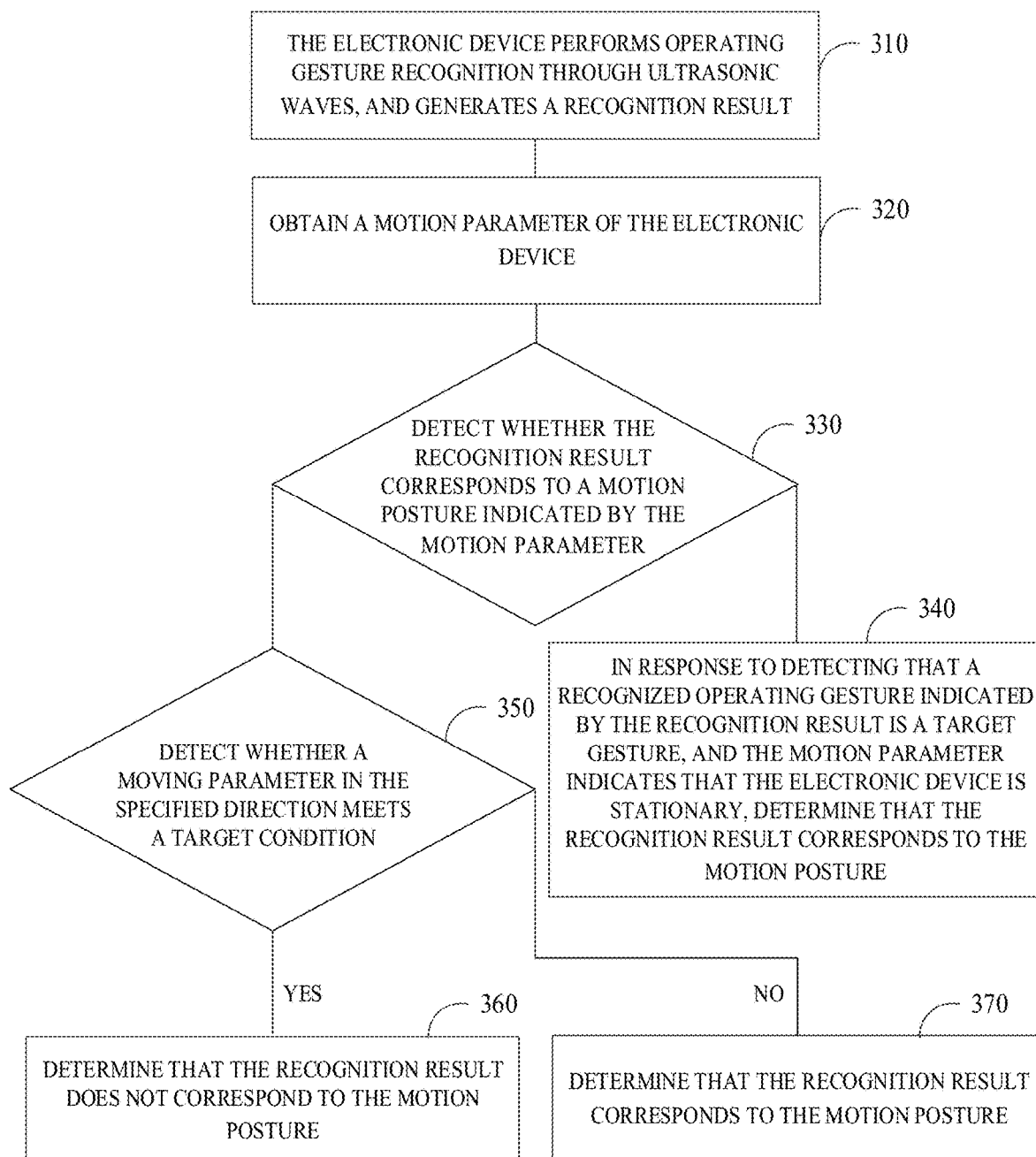
FIG. 10 is a schematic flowchart illustrating a device control method provided in other implementations of the present disclosure.

As illustrated in FIG. 10, a device control method is provided in implementations of the present disclosure. The method is applicable to an electronic device which includes an ultrasonic emitter and an ultrasonic receiver, and the method begins at block 301.

At block 310: operating gesture recognition is performed by the electronic device through ultrasonic waves, and a recognition result is generated.

At block 320: a motion parameter of the electronic device is obtained.

At block 330: whether the recognition result corresponds to a motion posture indicated by the motion parameter is detected.

At block 340: in response to detecting that a recognized operating gesture indicated by the recognition result is a target gesture, and the motion parameter indicates that the electronic device is stationary, the recognition result is determined to correspond to the motion posture.

At block 350: in response to detecting that the recognized operating gesture indicated by the recognition result is the target gesture, and the motion parameter indicates that the electronic device is moving in the specified direction, whether a moving parameter in the specified direction meets a target condition is detected.

It should be noted that, when the user is watching contents, the user sometimes holds the electronic device in hands. For example, when the electronic device is a smart phone, the user may hold the electronic device with one hand to watch contents. In this case, when the user is performing a non-touch operation, the electronic device may move slightly. For example, the user holds the smart phone with a left hand, and uses a right hand to slide from the bottom of the smart phone to the top of the smart phone without touching the smart phone. In the operation process of the right hand, the user's left hand may instinctively move toward the user, which causes the smart phone to move toward the user. In this case, if the recognition result is directly determined based on the aforementioned contents, misjudgment may be caused.

In order to improve the above problems, when the electronic device detects that the recognized operating gesture indicated by the recognition result is the target gesture and the motion parameter indicates that the electronic device is moving in the specified direction, the motion parameter in the specified direction can be further detected.

It should be noted that, the specified direction in this implementation is the same as or opposite to the moving direction of the operating gesture. If the motion parameter indicates that the electronic device moves in a direction other than the specified direction, the electronic device can directly determine that the recognition result is valid. Y-axis direction defined in the foregoing is taken as an example. At the top and bottom of the electronic device each, the ultrasonic emitter is provided, when the electronic device detects that the user's operating gesture is to slide from the bottom to the top of the electronic device (i.e., the Y-axis direction) without touching the electronic device, the electronic device detects that the motion parameter indicates that the electronic device is moving in X-axis or Z-axis direction, such that the electronic device can directly determine that the recognition result is valid.

At block 360: the recognition result is determined not to correspond to the motion posture, in response to detecting that the moving parameter in the direction meets the target condition.

At block 370: the recognition result is determined to correspond to the motion posture, in response to detecting that the moving parameter in the direction does not meet the target condition.

The target condition includes that a moving distance is greater than a specified distance, or a maximum acceleration of a moving electronic device is greater than a specified acceleration.

It can be understood that, when the user actually performs the operating gesture, even if the electronic device will be moved, the electronic device will not move with a large moving amplitude, so the moving distance of the electronic device or an acceleration of the moving electronic device will not be too large. Therefore, by comparing the moving distance of the electronic device with the specified distance and comparing the maximum acceleration with the specified acceleration, whether the electronic device is currently moved because of an instinctive operation of the user can be determined.

For example, the Y-axis direction defined in the foregoing is taken as an example. At The top and bottom of the electronic device each, the ultrasonic emitter is provided, so when the electronic device detects that the user's operating gesture is to slide from the bottom to the top of the electronic device (i.e., the Y-axis direction) without touching the electronic device, and obtains that the electronic device is moving in the Y-axis direction, the electronic device further detects that the moving distance in the Y-axis direction is less than the specified distance, or the maximum acceleration of the moving electronic device is less than the specified acceleration, as such, the recognition result can still be determined to be valid. On the contrary, when the electronic device detects that the user's operating gesture is to slide from the bottom to the top of the electronic device (i.e., the Y-axis direction) without touching the electronic device, and obtains that the electronic device is moving in the Y-axis direction, the electronic device further detects that the moving distance in the Y-axis direction is greater than the specified distance, or the maximum acceleration of the moving electronic device is greater than the specified acceleration, as such, the recognition result can be determined to be invalid.

It should be noted that, the gyroscope adopted in the aforementioned implementations is just an exemplary illustration, and the electronic device can also collect the motion parameter of the electronic device through other sensors, such as an acceleration sensor, a gyroscope sensor, an infrared sensor, a gravity sensor, a magnetic sensor, a direction sensor, a linear sensor, etc. In addition, a light sensor, a pressure sensor, a temperature sensor, a proximity sensor, etc. can also be built in to assist in collecting other information of the electronic device. In this implementation, the motion parameter can include at least one of: data collected by the gravity sensor, data collected by the acceleration sensor, and data collected by the gyroscope.

A device control method is provided in the disclosure. In the method, the operating gesture recognition can be performed through ultrasonic waves and based on the ultrasonic emitter and the ultrasonic receiver, the recognition result can be generated, and the motion parameter of the electronic device can be obtained. Then whether the recognition result corresponds to the motion posture indicated by the motion parameter is detected. The recognition result can be determined to be valid in response to detecting that the recognition result corresponds to the motion posture, and the electronic device can be controlled based on the recognition result. The motion parameter of the electronic device in the specified direction can be further recognized in response to detecting that the recognition result does not correspond to the motion posture, such that recognition accuracy can be further improved. According to the method, the motion parameter of the electronic device can be used to verify the recognition result of operating gesture obtained by the ultrasonic waves, such that the accuracy of the gesture recognition through ultrasonic waves can be further improved.

Figure 11:
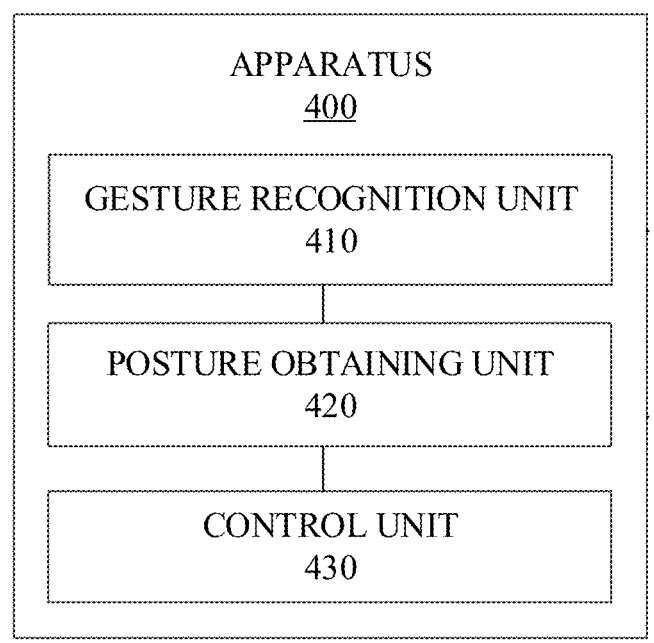
FIG. 11 is a structural block view illustrating a device control apparatus provided in implementations of the present disclosure.

As illustrated in FIG. 11, a device control apparatus 400 is provided in implementations of the present disclosure. The apparatus 400 runs on the electronic device which includes an ultrasonic emitter and an ultrasonic receiver. The apparatus 400 includes a gesture recognition unit 410, a posture obtaining unit 420, and a control unit 430.

The gesture recognition unit 410 is configured to perform operating gesture recognition through ultrasonic waves, and generate a recognition result.

Figure 12:
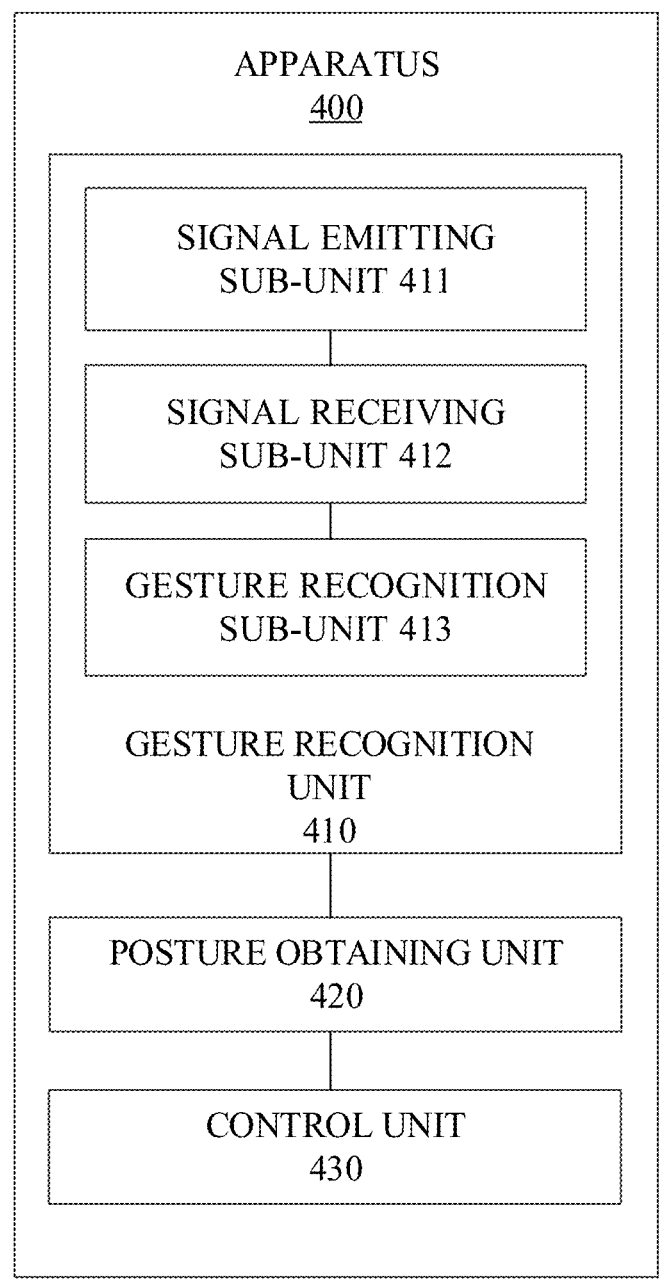
FIG. 12 is a structural block view illustrating a device control apparatus provided in other implementations of the present disclosure.

As an implementation, as illustrated in FIG. 12, the gesture recognition unit 410 includes a signal emitting sub-unit 411, a signal receiving sub-unit 412, and a gesture recognition sub-unit 413.

The signal emitting sub-unit 411 is configured to trigger the ultrasonic emitter to emit an ultrasonic signal, once the electronic device is in a target scenario. The signal receiving sub-unit 412 is configured to receive through the ultrasonic receiver a returned ultrasonic signal reflected by an object. The gesture recognition sub-unit 413 is configured to perform the operating gesture recognition based on the returned ultrasonic signal, and generate the recognition result.

The posture obtaining unit 420 is configured to obtain a motion parameter of the electronic device.

The control unit 430 is configured to verify the recognition result based on the motion parameter, and control the electronic device based on a verification result.

The control unit 430 is configured to detect whether the recognition result corresponds to the motion posture indicated by the motion parameter; determine that the recognition result is valid in response to detecting that the recognition result corresponds to the motion posture, and control the electronic device based on the recognition result; determine that the recognition result is invalid, in response to detecting that the recognition result does not correspond to the motion posture.

As an implementation, the control unit 430 is configured to determine that the recognition result corresponds to the motion posture indicated by the motion parameter, in response to detecting that a recognized operating gesture indicated by the recognition result is a target gesture, and the motion parameter indicates that the electronic device is stationary. The control unit 430 is further configured to determine that the recognition result does not correspond to the motion posture, in response to detecting that the recognized operating gesture indicated by the recognition result is the target gesture, and the motion parameter indicates that the electronic device is moving in a specified direction. A moving direction of the target gesture corresponds to the specified direction.

Figure 13:
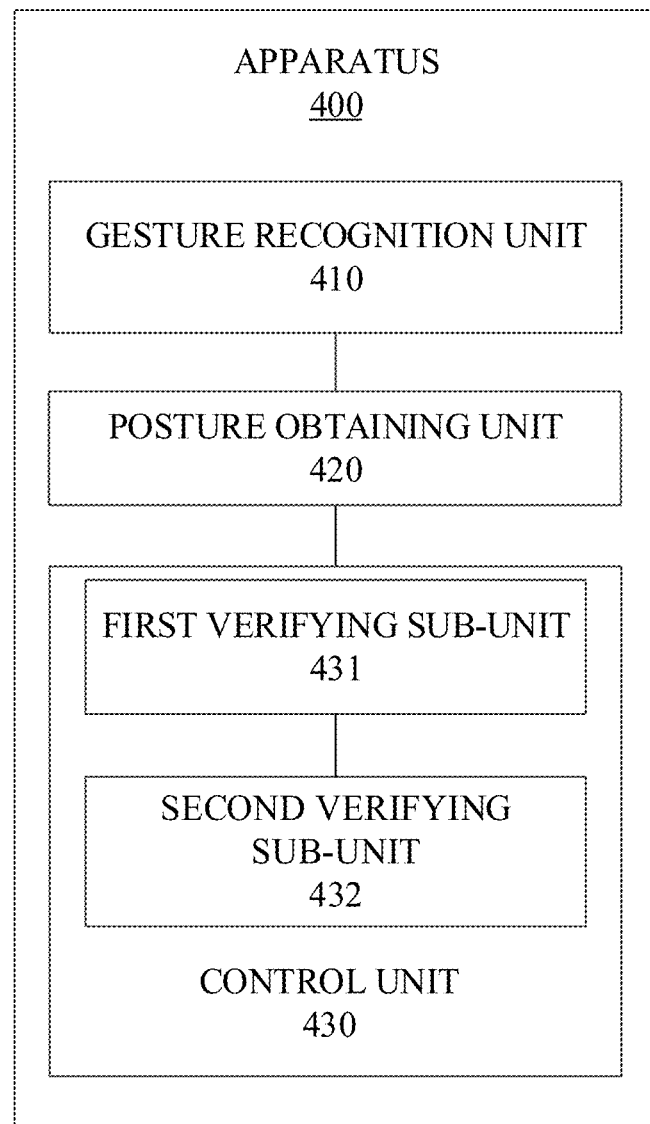
FIG. 13 is a structural block view illustrating a device control apparatus provided in other implementations of the present disclosure.

As illustrated in FIG. 13, the control unit 430 includes a first verifying sub-unit 431 and a second verifying sub-unit 432.

The first verifying sub-unit 431 is configured to detect whether the recognition result corresponds to the motion posture indicated by the motion parameter.

The second verifying sub-unit 432 is configured to: detect whether the motion parameter in the specified direction meets a target condition, in response to detecting that the recognized operating gesture indicated by the recognition result is the target gesture, and the motion parameter indicates that the electronic device is moving in the specified direction; determine that the recognition result does not correspond to the motion posture in response to detecting that the moving parameter in the direction meets the target condition; determine that the recognition result corresponds to the motion posture, in response to detecting that the moving parameter in the direction does not meet the target condition.

As an implementation, the target condition includes that a moving distance is greater than a specified distance, or a maximum acceleration of a moving electronic device is greater than a specified acceleration.

It should be noted that, in the present disclosure, the apparatus implementations correspond to the aforementioned method implementations, and specific principles of the apparatus implementations can be referred to the aforementioned method implementations, which will not be repeated here.

It is to be noted that, the apparatus for display-brightness adjustment described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

Figure 14:
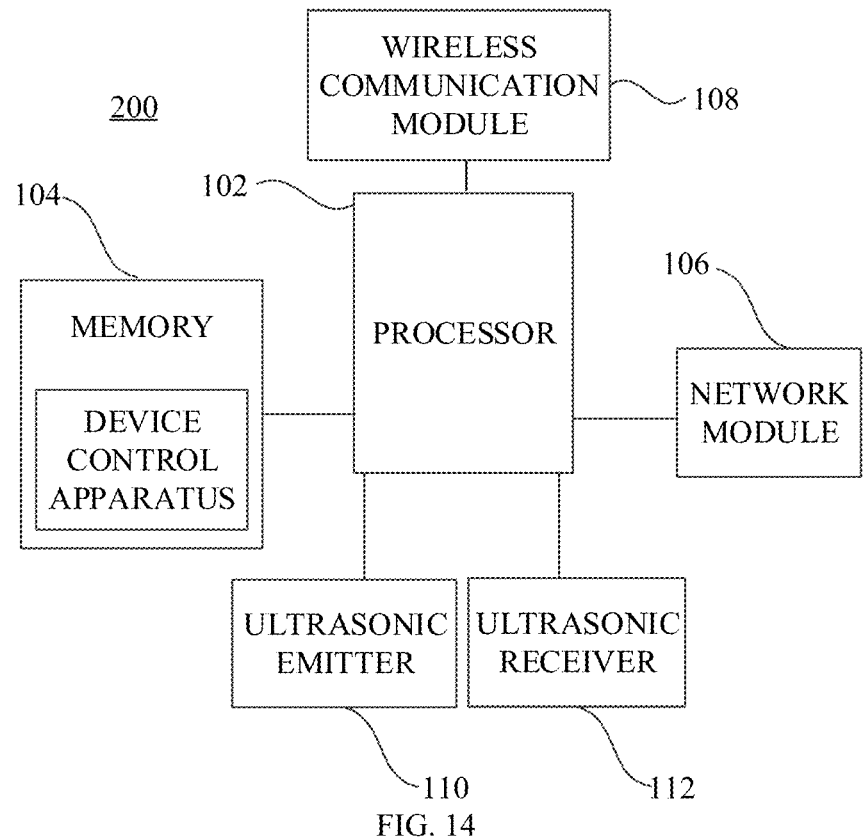
FIG. 14 is a structural block view illustrating an electronic device for executing a device control method according to implementations of the present disclosure.

The following will describe an electronic device provided in the present disclosure, with reference to FIG. 14.

In implementations of the present disclosure, another electronic device 200 is configured to perform the aforementioned device control method, based on the aforementioned device control method and apparatus. As illustrated in FIG. 14, the electronic device 200 includes one or more (just one illustrated in FIG. 14) coupled processors 102, a memory 104, a network module 106, a wireless communication module 108, an ultrasonic emitter 110, and an ultrasonic receiver 112. The memory 104 is configured to store one or more programs which can execute the aforementioned implementations, and the processor 102 is configured to execute the one or more programs stored in the memory 104.

The processor 102 may include one or more cores for data process. The processor 102 is configured to connect with various parts of the whole electronic device 200 through various interfaces and circuits, and the processor 102 is configured to run or execute instructions, programs, code sets, or instruction sets stored in the memory 104, and invoke data stored in the memory 104 to perform various functions of the electronic device 200 and process data. Optionally, the processor 102 may be implemented by adopting at least one of hardware forms of digital signal processing (DSP), field-programmable gate array (FPGA), programmable logic array (PLA). The processor 102 may integrate one of or a combination of a central processing unit (CPU), a graphics processing unit (GPU), a modem, etc. The CPU is primarily configured to process an operating system, a user interface, applications, etc. The GPU is configured to render and draw display contents. The modem is configured to process the wireless communication. It can be understood that, the modem can also be implemented through a single communication chip and without being integrated into the processor 102.

The memory 104 may include a random access memory (RAM), and may also include a read-only memory (ROM). The memory 104 is configured to store instructions, programs, codes, code sets, or instruction sets. For example, a device control apparatus may be stored in the memory 104. The device control apparatus may be the aforementioned apparatus 400. The memory 104 may include a program storage region and a data storage region. The program storage region is configured to store instructions for implementing the operation system, instructions for implementing at least one function (such as a touch function, a sound playing function, an image displaying function, etc.), and instructions for implementing undermentioned implementations, etc. The data storage region is further configured to store data (such as phonebooks, audio and video data, chat record data, etc.) which are created during usage of a storage terminal 100.

A network module 106 is configured to receive and emit ultrasonic waves to realize conversion between the ultrasonic waves and electrical signals, thereby communicating with communication networks or other devices, for example, communicating with an audio playing device. The network module 106 may include circuit units (such as an antenna, a radio frequency transceiver, a digital signal processor, an encryption/decryption chip, a subscriber identity module (SIM) card, a memory, etc.) for performing these functions. The network module 106 can be configured to communicate with various networks such as the Internet, a corporate internet, a wireless network, or other devices through the wireless network. The above wireless network may include a cellular telephone network, a wireless local area network (WLAN), or a metropolitan area network (MAN). For example, the network module 106 may be configured to exchange information with base stations.

A wireless communication module 108 may be configured to receive and emit Bluetooth signals or infrared signals. An ultrasonic emitter 110 may include a pick-up and a speaker. An ultrasonic receiver 112 may include a first microphone disposed close to the pick-up and a second microphone disposed close to the speaker.

Figure 15:
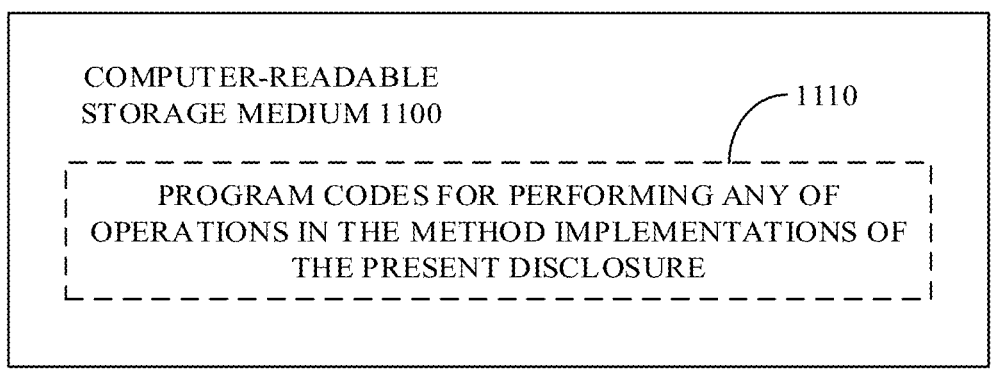
FIG. 15 is a structural block view illustrating a storage unit for saving or carrying program codes to realize a device control method provided in implementations of the present disclosure.

FIG. 15 is a structural block view illustrating a computer-readable storage medium provided in implementations of the present disclosure. As illustrated in FIG. 15, A computer-readable storage medium 1100 is configured to store program codes which are invoked by a processor to execute methods described in the aforementioned method implementations.

The computer-readable storage medium 1100 may be an electronic memory such as a flash memory, an electrically erasable programmable read-only memory (EEPROM), an erasable programmable read-only memory (EPROM), a hard disk, a ROM, or the like. Optionally, the computer-readable storage medium 1100 may include a non-transitory computer-readable storage medium. The computer-readable storage medium 1100 has a storage space for storing program codes 810 which are configured to execute any of operations in the aforementioned methods. These program codes may be read from one or more computer program products or written into the one or more computer program products. For example, program codes 1110 may be compressed in an appropriate form.

A device control method, a device control apparatus, an electronic device, and a storage medium are provided in implementations of the present disclosure. In the method, the operating gesture recognition can be performed through ultrasonic waves and based on the ultrasonic emitter and the ultrasonic receiver, the recognition result can be generated, and the motion parameter of the electronic device can also be obtained. Then the recognition result is verified based on the motion parameter, and the electronic device is controlled based on the recognition result. According to the method, the motion parameter of the electronic device can be used to verify the result of operating gesture recognition obtained by the ultrasonic waves, such that the accuracy of the gesture recognition through ultrasonic waves can be further improved.

It should be noted that, the above implementations are only used to illustrate the technical solution of the present disclosure, not to limit it. Although the present disclosure is illustrated in detail with reference to the aforementioned implementations, those skilled in the art should understand that they can still modify the technical solution recorded in the aforementioned implementations, or replace some of technical features equally. These modifications or replacements do not drive the essence of the corresponding technical solution to deviate from the spirit and scope of the technical solution of each implementations of the present disclosure.

What is claimed is:

1. A device control method, performed by an electronic device comprising an ultrasonic emitter and an ultrasonic receiver, and comprising:
   performing operating gesture recognition through ultrasonic waves, and generating a recognition result;
   obtaining a motion parameter of the electronic device;
   determining that the recognition result corresponds to a motion posture indicated by the motion parameter, in response to detecting that a recognized operating gesture indicated by the recognition result is a target gesture, and the motion parameter indicates that the electronic device is stationary;
   determining that the recognition result does not correspond to the motion posture, in response to detecting that the recognized operating gesture indicated by the recognition result is the target gesture, and the motion parameter indicates that the electronic device is moving in a specified direction, wherein a moving direction of the target gesture corresponds to the specified direction; and
   determining that the recognition result is valid in response to detecting that the recognition result corresponds to the motion posture, and controlling the electronic device based on the recognition result.

2. The method of claim 1, further comprising:
   determining that the recognition result is invalid in response to detecting that the recognition result does not correspond to the motion posture.

3. The method of claim 1, wherein determining that the recognition result does not correspond to the motion posture, in response to detecting that the recognized operating gesture indicated by the recognition result is the target gesture, and the motion parameter indicates that the electronic device is moving in the specified direction comprises:
    determining that the recognition result does not correspond to the motion posture, in response to detecting that the recognized operating gesture indicated by the recognition result is the target gesture, the motion parameter indicates that the electronic device is moving in the specified direction, and the moving parameter in the specified direction meets a target condition.

4. The method of claim 3, further comprising:
    determining that the recognition result corresponds to the motion posture, in response to detecting that the recognized operating gesture indicated by the recognition result is the target gesture, the motion parameter indicates that the electronic device is moving in the specified direction, and the moving parameter in the direction does not meet the target condition.

5. The method of claim 3, wherein the target condition comprises:
    a moving distance is greater than a specified distance; or
    a maximum acceleration when moving is greater than a specified acceleration.

6. The method of claim 1, wherein the recognition result is configured with generation time, and the method further comprises:
    before verifying the recognition result based on the motion parameter, and controlling the electronic device based on the verification result,
        obtaining generation time corresponding to a historically updated recognition result by taking generation time corresponding to a latest updated recognition result as a starting point, in response to detecting that a configuration file storing the recognition result is updated;
        obtaining a number of recognition results within a specified time period starting from the generation time corresponding to the latest updated recognition result, wherein the specified time period is a length of time taken by a user to complete a non-touch operating gesture;
        determining that the recognition result is invalid, in response to the number being greater than 1; and
        taking the recognition result as a recognition result to be verified with the motion parameter of the electronic device, in response to the number being 1.

7. The method of claim 1, wherein obtaining the motion parameter of the electronic device comprises:
    collecting the motion parameter through a configured gyroscope.

8. The method of claim 1, wherein the motion parameter of the electronic device comprises at least one of: a motion direction, an acceleration, and a motion distance.

9. The method of claim 1, wherein the motion parameter comprises at least one of: data collected by a gravity sensor, data collected by an acceleration sensor, and data collected by a gyroscope.

10. The method of claim 1, further comprising:
    emitting an ultrasonic signal, in response to detecting that a specified application is launched, wherein the specified application allows to enable the operating gesture recognition based on the ultrasonic waves.

11. The method of claim 10, wherein detecting that the specified application is launched comprises:
    searching a stored list-based configuration file for a currently launched or foreground running application, wherein an application in the list allows to enable the operating gesture recognition based on the ultrasonic waves; and
    detecting that the specified application is launched on condition that the currently launched or foreground running application exists in the stored list-based configuration file.

12. The method of claim 11, further comprising:
    obtaining a state of a controlling control corresponding to the currently launched or foreground running application; and
    determine whether to record the currently launched or foreground running application in the stored list-based configuration file based on the state.

13. The method of claim 1, wherein performing the operating gesture recognition by the electronic device through ultrasonic waves, and generating the recognition result comprises:
    triggering the ultrasonic emitter to emit an ultrasonic signal, once the electronic device is in a target scenario;
    receiving through the ultrasonic receiver a returned ultrasonic signal reflected by an object; and
    performing the operating gesture recognition based on the returned ultrasonic signal, and generating the recognition result.

14. An electronic device, comprising an ultrasonic emitter, an ultrasonic receiver, a processor, and a memory, wherein one or more programs are stored in the memory and are configured to be executed by the processor to:
    perform operating gesture recognition through ultrasonic waves, and generate a recognition result;
    obtain a motion parameter of the electronic device;
    determine that the recognition result corresponds to a motion posture indicated by the motion parameter, in response to detecting that a recognized operating gesture indicated by the recognition result is a target gesture, and the motion parameter indicates that the electronic device is stationary;
    determine that the recognition result does not correspond to the motion posture, in response to detecting that the recognized operating gesture indicated by the recognition result is the target gesture, and the motion parameter indicates that the electronic device is moving in a specified direction, wherein a moving direction of the target gesture corresponds to the specified direction; and
    determine that the recognition result is valid in response to detecting that the recognition result corresponds to the motion posture, and controlling the electronic device based on the recognition result.

15. The electronic device of claim 14, wherein in terms of determining that the recognition result does not correspond to the motion posture, in response to detecting that the recognized operating gesture indicated by the recognition result is the target gesture, and the motion parameter indicates that the electronic device is moving in the specified direction, the one or more programs are configured to be executed by the processor to:
    determine that the recognition result does not correspond to the motion posture, in response to detecting that the recognized operating gesture indicated by the recognition result is the target gesture, the motion parameter indicates that the electronic device is moving in a specified direction, and a moving parameter in the specified direction meets a target condition.

16. A non-transitory computer-readable storage medium configured to store program codes which, when operated by a processor, are configured to:
- perform operating gesture recognition through ultrasonic waves, and generate a recognition result;
- obtain a motion parameter of the electronic device;
- determine that the recognition result corresponds to a motion posture indicated by the motion parameter, in response to detecting that a recognized operating gesture indicated by the recognition result is a target gesture, and the motion parameter indicates that the electronic device is stationary;
- determine that the recognition result does not correspond to the motion posture, in response to detecting that the recognized operating gesture indicated by the recognition result is the target gesture, and the motion parameter indicates that the electronic device is moving in a specified direction, wherein a moving direction of the target gesture corresponds to the specified direction; and
- determine that the recognition result is valid in response to detecting that the recognition result corresponds to the motion posture, and controlling the electronic device based on the recognition result.

* * * * *